United States Patent [19]

Ishigaki et al.

[11] Patent Number: 4,920,095
[45] Date of Patent: Apr. 24, 1990

[54] SUPERCONDUCTING ENERGY STORAGE DEVICE

[75] Inventors: Yukio Ishigaki, Hitachi; Tadasi Sonobe, Iwaki, both of Japan

[73] Assignee: Hitachi, Ltd., Tokyo, Japan

[21] Appl. No.: 223,640

[22] Filed: Jul. 25, 1988

[30] Foreign Application Priority Data

Jul. 29, 1987 [JP] Japan .................................. 62-187571
Jul. 29, 1987 [JP] Japan .................................. 62-187572

[51] Int. Cl.$^5$ ...................... H01F 7/22; H01L 39/14; H02J 15/00
[52] U.S. Cl. ...................................... 505/1; 322/2 R; 322/4; 335/216; 336/DIG. 1; 505/880
[58] Field of Search .................. 322/2 R, 4; 335/216; 336/DIG. 1; 505/1, 880, 887; 376/142

[56] References Cited

U.S. PATENT DOCUMENTS

| 3,205,413 | 9/1965 | Anderson | 505/880 X |
| 3,919,677 | 11/1975 | Young et al. | 335/216 |
| 4,263,096 | 4/1981 | Ohkawa et al. | 335/216 X |
| 4,277,768 | 7/1981 | Burgeson et al. | 335/216 |
| 4,599,519 | 7/1986 | Boenig | 363/14 X |
| 4,679,020 | 7/1987 | Kawamura et al. | 335/216 |

FOREIGN PATENT DOCUMENTS 47-16895 9/1972 Japan .................................. 376/142

OTHER PUBLICATIONS

"V. Energy Storage by Superconducting Coil", Denki Gakkai Mag., 6/1981, pp. 525–529.
News, "Superconducting Electric Power Storage System", Newspaper Nikkan Kogyo Shinbun, 12/6/83.
JP-A-63-52401, March 5, 1988.

Primary Examiner—R. J. Hickey
Attorney, Agent, or Firm—Antonelli, Terry & Wands

[57] ABSTRACT

A superconducting energy storage device for storing electric power in superconducting magnets in the form of magnetic energy. The superconducting magnets are include a superconducting toroidal magnet and a superconducting solenoid magnet arranged to be inscribed in the inside of the superconducting toroidal magnet, the magnets being connected electrically in series to each other. Further, the superconducting magnets include a plurality of units, each of which is formed as a combination of the aforementioned toroidal and solenoid superconducting magnets, the units being piled up in the axial direction of the superconducting solenoid magnet. In the thus arranged device, electromagnetic force generated in the superconducting magnets can be supported without the necessity of firm bed rock, thereby eliminating the limitation in conditions of location of the energy storage device. Further, the plurality of energy storage units can be arranged effectively so that space can be saved.

28 Claims, 5 Drawing Sheets

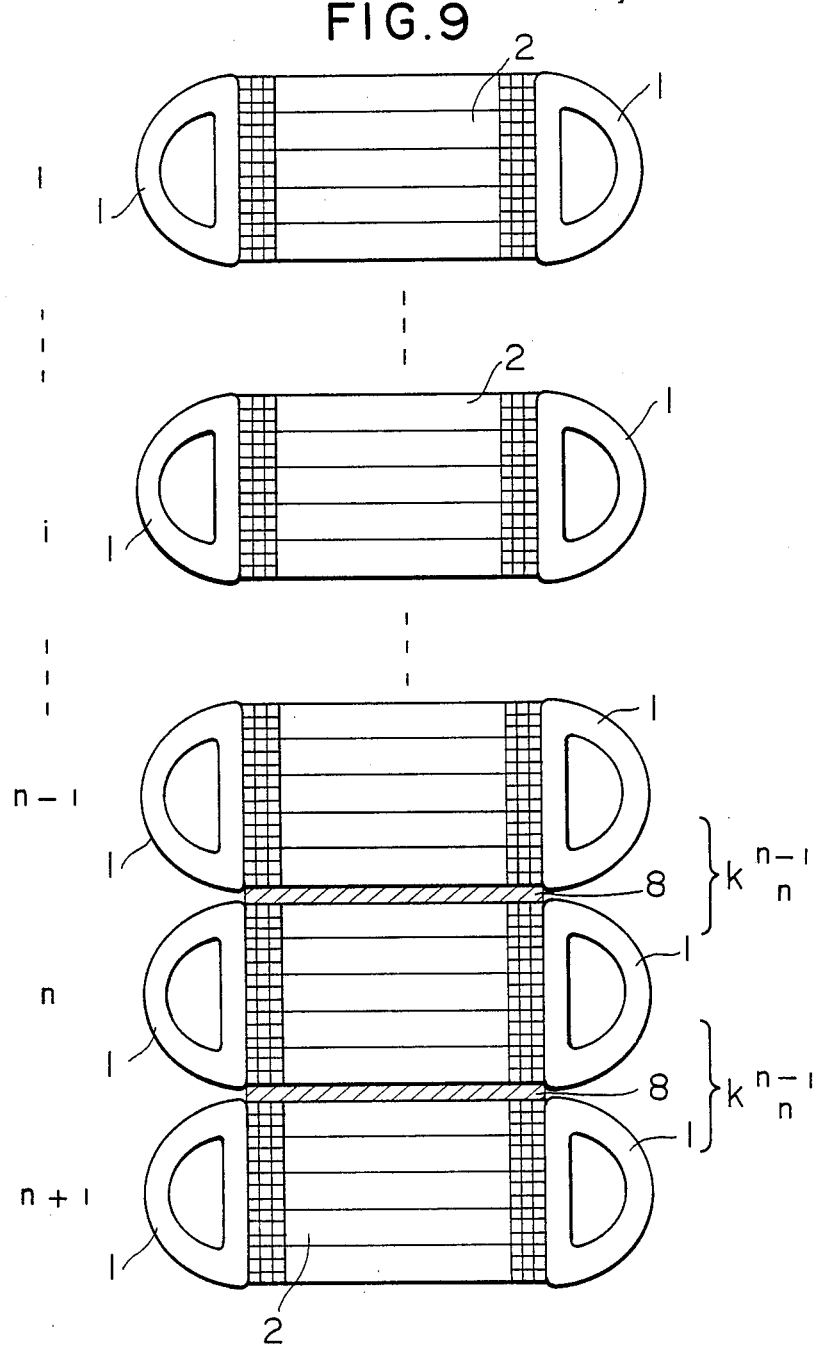

SUPERCONDUCTING ENERGY STORAGE DEVICE

BACKGROUND OF THE INVENTION

The present invention relates to a superconducting energy storage device, and, more particularly, relates to a superconducting energy storage device which is favorable for storage of electric power in superconducting magnets in the form of magnetic energy.

Heretofore, two types of magnets have been investigated or used for conventional superconducting energy storage devices. One type is a solenoid system in which a solenoid-type superconducting magnet is used for energy storage as described in Special Issue "V, Energy Storage by means Superconducting Coil," the Journal of the Institute of Electrical Engineers of Japan, Vol. 101, No. 6, pp. 525-529, June, 1981. The other type is a toroidal system in which a toroidal-type superconducting magnet is used for energy storage as described in "The Business and Technology Daily News" issued Dec. 6, 1983. In both the descriptions of the solenoid and toroidal systems, the realization of the superconducting energy storage device has been discussed in view of costs on the premise that electromagnetic force generated by such a superconducting magnet is supported by a bed rock such as granite.

Because each of the conventional superconducting energy storage devices is provided on the premise that electromagnetic force generated by such a superconducting magnet used for energy storage must be supported by an external bed rock, the device cannot be located freely except in a place having such a firm bed rock. In the prior art, therefore, there has been a problem in that the conditions for location of the energy storage device have some limitations.

Recently, a hybrid magnet type superconducting energy storage device, in which a toroidal magnet and a solenoid magnet are used as a superconducting energy storage magnet so that central force generated by the toroidal magnet in the direction of the large radius can be canceled by hoop force generated by the solenoid magnet, has been disclosed in JP-A-No. 63-52401 application by the same inventor of this application.

The device of this type has however a problem in that a gap is formed in the contacting surface between the toroidal magnet and the solenoid magnet because the solenoid magnet is arranged to be in contact with the circular surface of the circular toroidal magnet.

Further, most of these conventional techniques merely relate to the arrangement and production of a single unit of a superconducting energy storage device. In other words, there is no discussion of the provision of a plurality of units.

Heretofore, there has been a tendency to form the superconducting energy storage device in a large-scale unit. Taking a power plant as an example, the output of kilowatts from the power plant is generated by a plurality of electric generators, not by a single electric generator. It is apparent from this fact that the superconducting energy storage device should also be separated into a plurality of units or devices.

A new problem arises in arrangement of a plurality of energy storage devices. Particularly, because a large number of energy storage devices are to be located in the vicinity of cities, the limitation in conditions of location of the energy storage device will be made more severe.

SUMMARY OF THE INVENTION

It is therefore an object of the present invention to provide a superconducting energy storage device in which electromagnetic force generated in superconducting magnets can be supported without necessity for the aforementioned firm bed rock, thereby eliminating the aforementioned limitation in conditions of location.

It is another object of the present invention to provide a superconducting energy storage device in which a plurality of energy storage units can be effectively arranged so that space can be saved.

It is a further object of the present invention to provide a superconducting energy storage device in which, when a superconducting solenoid magnet is inside of a superconducting toroidal magnet, the contacting surface therebetween is established to be a plane to thereby form firmer connection.

The foregoing objects of the present invention are attained by connecting a superconducting toroidal magnet electrically in series to a superconducting solenoid magnet which is arranged to be inside of the superconducting toroidal magnet.

Further, the foregoing objects of the present invention are attained by superconducting magnets comprising a plurality of units, each of the units being formed by connecting a superconducting toroidal magnet electrically in series to a superconducting solenoid magnet arranged to be inside of the superconducting toroidal magnet in the direction of the large radius, so that contacting force generated by the superconducting toroidal magnet in the direction of the large radius is canceled by expanding force, that is, hoop force, generated by the superconducting solenoid magnet, the plurality of units being piled up along the axis of the superconducting solenoid magnet.

When excited, generally, the superconducting toroidal magnet generates contracting force in the direction of the large radius while generating expanding force in the direction of the small radius. On the other hand, when excited, the superconducting solenoid magnet generates radially expanding force and axially contracting force. According to the aforementioned construction of the present invention, the contracting force of the superconducting toroidal magnet acting in the direction of the large radius can be canceled by the radially expanding force of the superconducting solenoid magnet to thereby make, for example, supporting of electromagnetic force from the outside, such as with a bed rock, unnecessary. Accordingly, the foregoing objects of the present invention can be attained.

By piling-up the plurality of superconducting energy storage units in the axial direction, axially attracting force acting on the units serves as a compressing internal force at a junction between adjacent units but does not serve as an external force.

The synthetic inductance L of one superconducting energy storage unit before piling-up is represented by the equation:

$$L = L_1 + L_2 \qquad (1)$$

where $L_1$ represents the self-inductance of the superconducting toroidal magnet, and $L_2$ represents the self-inductance of the superconducting solenoid magnet.

The synthetic inductance $L_2'$ of the two units piled up is represented by the equation:

$$L_2' = 2(L_1 + L_2) + 2kL_2 = 2L + 2kL_2 \quad (2)$$

where k is a coupling coefficient between the adjacent solenoid magnets $L_1$, $L_2$ of the two units.

It is apparent from the above equations that, when the two units are stacked, the synthetic inductance increases by $2kL_2$.

As described above, when a number, n, of units are piled up, storage energy increases to be more than a value multiplied by a factor n.

BRIEF DESCRIPTION OF THE DRAWINGS

Preferred embodiments of the present invention will be described in conjunction with the accompanying drawings, in which:

FIG. 9 is a longitudinal section showing the schematic structure of magnets as a fifth embodiment of the superconducting energy storage device according to the present invention.

DESCRIPTION OF THE PREFERRED EMBODIMENTS

Figure 1A:
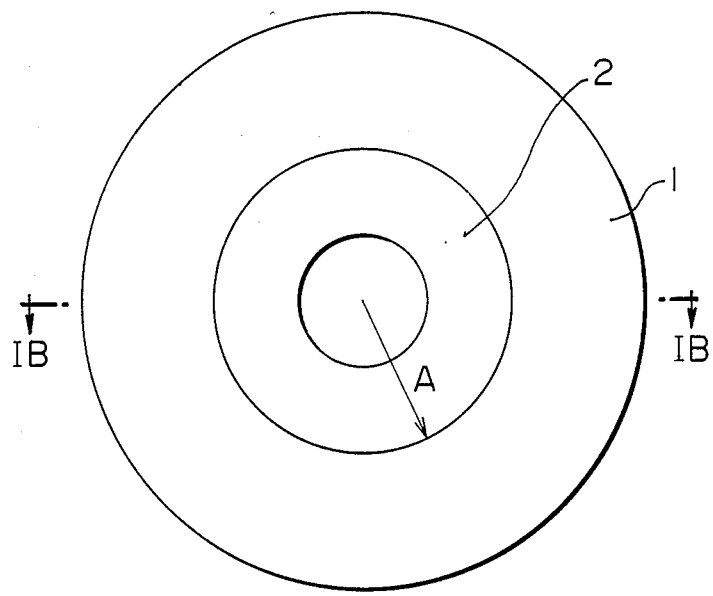
FIG. 1A is a plan view of a longitudinal section showing the schematic structure of magnets as a first embodiment of the superconducting energy storage device according to the present invention.

Referring to the drawings, the preferred embodiment of the present invention will be described in detail.

Figure 1B:
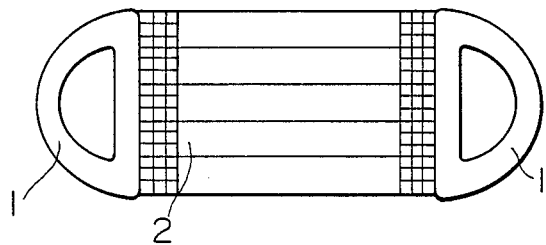
FIG. 1B is a longitudinal section in the direction of 1B—1B in FIG. 1A.
Figure 2:
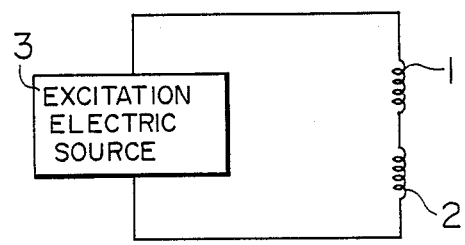
FIG. 2 is an example of an electrically equivalent circuit diagram of the magnets having the structure of FIG. 1.

Referring to FIGS. 1A and 1B, there is shown a first embodiment of the superconducting energy storage device according to the present invention, in which a superconducting toroidal magnet 1 and a superconducting solenoid magnet 2 are provided. In this embodiment, the cylindrical superconducting solenoid magnet 2 is arranged in the superconducting toroidal magnet 1 having a D-shaped section (hereinafter referred to as "D-section superconducting toroidal magnet"), along the innermost circumferential portion in the direction of the large radius of the latter as denoted by an arrow A in FIG. 1A so as to be inside in the toroidal magnet 1 as shown in FIGS. 1A and 1B to thereby form a superconducting energy storage device. Referring to FIG. 2, there is shown an electrically equivalent circuit of the device, in which the D-section superconducting toroidal magnet 1 and the cylindrical superconducting solenoid magnet 2 are connected in series and in which a common excitation electric source 3 not shown in FIGS. 1A and 1B, is provided so that the device can serve as a superconducting energy storage device.

According to the aforementioned construction, the D-section superconducting toroidal magnet 1 is energized by the excitation electric source 3 to thereby generate electromagnetic force contracting in the direction of the large radius, whereas the cylindrical superconducting solenoid magnet 2 is energized to thereby generate electromagnetic force in the reverse direction to the electromagnetic force generated by the D-section superconducting toroidal magnet 1. The aforementioned electromagnetic forces can be canceled out with each other by matching of the two magnets in winding number and the like. Accordingly, supporting of electromagnetic force by a bed rock which was essential in the conventional superconducting energy storage device becomes unnecessary, so that the limitation of conditions of location of the superconducting energy storage device can be eliminated.

Figure 3:
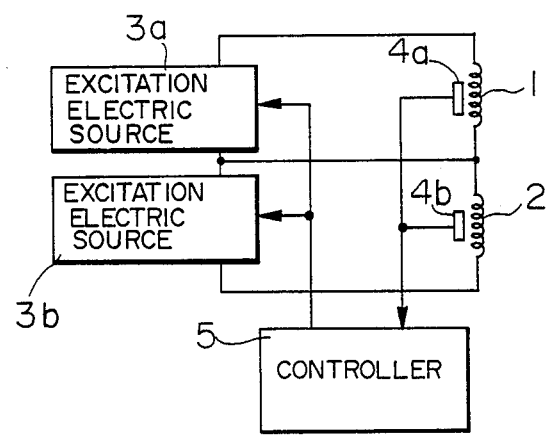
FIG. 3 is another example of an electrically equivalent circuit diagram of the magnets having the structure of FIG. 1.

Referring to FIG. 3, there is shown another circuit, in which: independent excitation electric sources 3a and 3b are provided to the D-section superconducting toroidal magnet 1 and the cylindrical superconducting solenoid magnet 2, respectively; detectors 4a and 4b, which can be stress sensors for example, are provided for the D-section superconducting toroidal magnet 1 and the cylindrical superconducting solenoid magnet 2, respectively. A controller 5 is provided to monitor signals produced by the detectors 4a and 4b and to control the output of the excitation electric sources 3a and 3b based upon signals over a predetermined level to thereby balance the two electromagnetic forces.

Figure 4:
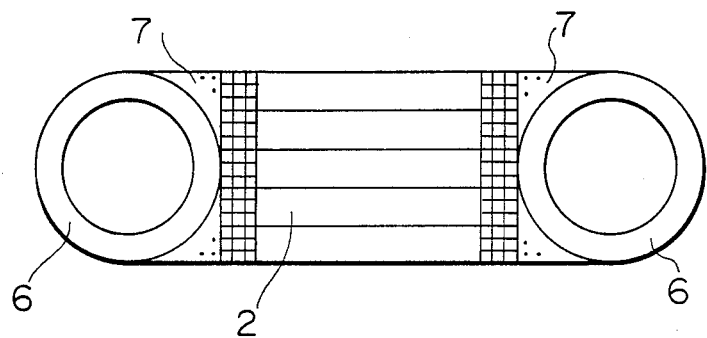
FIG. 4 is a longitudinal section showing the schematic structure of magnets as a second embodiment of the superconducting energy storage device according to the present invention.
Figure 5:
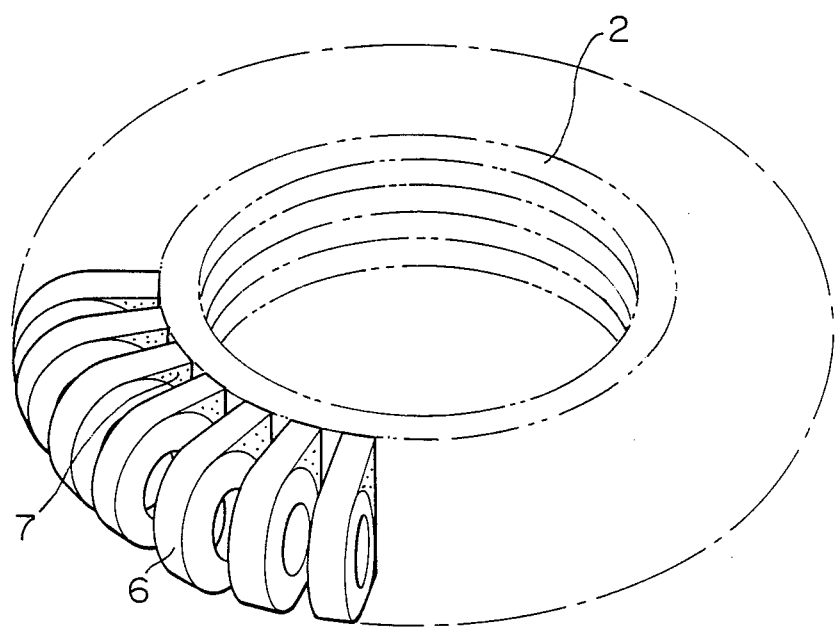
FIG. 5 is a stereoscopic view of FIG. 4.

Referring to FIG. 4, there is shown a second embodiment of the present invention, in which the superconducting toroidal magnet is circularly shaped in section (hereinafter referred to as "circular-section superconducting toroidal magnet"). A stereoscopic view of FIG. 4 is shown in FIG. 5. As shown in the drawings, the circular-section superconducting toroidal magnet 6 is provided with a support 7 arranged in the inside thereof to thereby form a D-section superconducting toroidal magnet geometrically. In this embodiment, the aforementioned cylindrical superconducting solenoid magnet 2 is arranged to the resulting D-section superconducting toroidal magnet in the same manner as described above to thereby attain the same effect.

The location of the superconducting energy storage device is to be based on the convenience of the electric power main line, because the device is used for the operation of an electric power system. However, the location of the conventional device had to be provided based on the condition that the device is established on some firm bed rock. According to the present invention, the contracting force of the superconducting toroidal magnet is canceled out by the expanding force of the superconducting solenoid magnet, so that supporting of electromagnetic force by the outside bed rock becomes unnecessary, thereby making it possible to locate the device in the most effective place for the operation of an electric power system. Further, the present invention can provide a superconducting energy storage device having very high storage energy density because magnetic energy can be stored in both magnets, that is, the superconducting toroidal magnet and the superconducting solenoid magnet.

In each of the aforementioned first and second embodiments, by use of a high-temperature ($\geq$ liquid nitrogen level) superconducting material as a wire material for each of the magnets, it is possible to provide a high-performance superconducting energy storage device which is very simple in terms of freezing equipment and maintenance.

Figure 6:
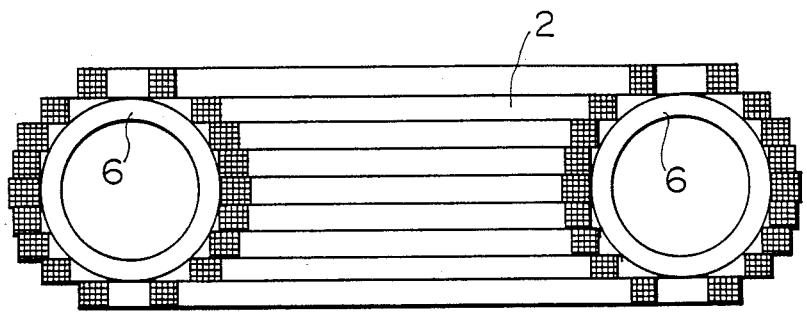
FIG. 6 is a longitudinal section showing the schematic structure of magnets as a third embodiment of the superconducting energy storage device according to the present invention.

Referring to FIG. 6, there is shown a third embodiment of the present invention, in which the cylindrical superconducting solenoid magnet 2 is arranged to enclose the circular-section superconducting toroidal magnet 6 to thereby form a superconducting energy storage device. An electrically equivalent circuit of the device of FIG. 6 is formed in the manner as in FIG. 2, in which the circular-section superconducting toroidal magnet 6 and the cylindrical superconducting solenoid magnet 2 are connected in series and in which the common excitation electric source 3 is provided so that the device can serve as a superconducting energy storage device. When excited, the circular-section superconducting toroidal magnet 6 generates centripetal force contracting the total radius and hoop force expanding the individual radii of the toroidal magnet 6 and the solenoid magnet 2. On the other hand, the superconducting solenoid magnet 2 generates hoop force expanding the total radius and pinch force because of the same current direction. Accordingly, the hoop force of the superconducting toroidal magnet 6 and the pinch force of the cylindrical superconducting solenoid magnet 2 can be canceled out with each other. At the same time, the centripetal force of the superconducting toroidal magnet 6 and the hoop force of the superconducting solenoid magnet 2 can be canceled out with each other. Accordingly, supporting of electromagnetic force by the bed rock which was essential in the conventional superconducting energy storage device becomes unnecessary, so that the limitation in conditions of location in the superconducting energy storage device can be eliminated.

Figure 7:
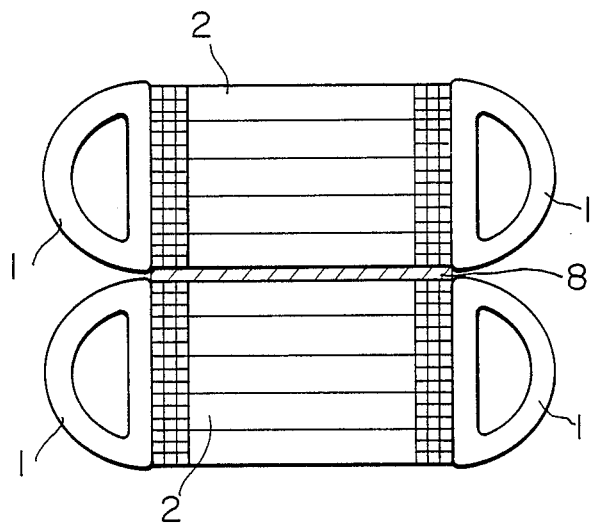
FIG. 7 is a longitudinal section showing the schematic structure of magnets as a fourth embodiment of the superconducting energy storage device according to the present invention.

Referring to FIG. 7, there is shown a fourth embodiment of the present invention, in which two energy storage units of an energy storage device are piled up through a support 8.

Figure 8:
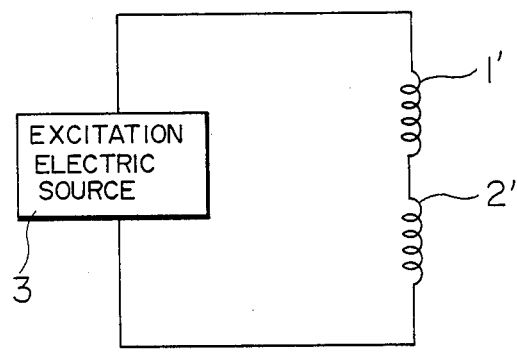
FIG. 8 is an electrically equivalent circuit diagram of the magnets having the structure of FIG. 7.

Each of the units is formed by arranging the cylindrical superconducting solenoid magnet 2 so as to be inside in the D-section superconducting toroidal magnet 1 at its innermost circumference in the direction of the large radius thereof. An electrically equivalent circuit of the device of FIG. 7 is as shown in FIG. 8, in which coils 1' and 2' are electrically equivalent to the respective D-section superconducting toroidal magnets 1 and the respective cylindrical superconducting solenoid magnets 2 which are connected in series, and a common excitation electric source 3 is provided so that the device can serve as a superconducting energy storage device. When excited, the D-section superconducting toroidal magnet 1 generates electromagnetic force contracting in the direction of the large radius. On the other hand, the cylindrical superconducting solenoid magnet 2 generates electromagnetic force in the reverse direction to the electromagnetic force generated by the D-section superconducting toroidal magnet 1. Accordingly, the two electromagnetic forces can be canceled out with each other by, for example, matching of the magnets in their number of turns. Although this embodiment has shown the case where the D-section superconducting toroidal magnet 1 is used, the present invention is applicable to the case where the D-section superconducting toroidal magnet 1 is replaced by a circular-section superconducting magnet 6 like that shown in FIG. 4 and being provided with a support 7 integrally provided on the inside of the circular-section superconducting toroidal magnet 6 so as to form a substantially D-section superconducting toroidal magnet.

The electromagnetic attraction forces acting on the respective units become contracting internal forces at a junction between the units so that the forces are canceled out with each other and do not appear as external force. Accordingly, supporting of the electromagnetic force of the stacked superconducting energy storage device specifically from the outside is unnecessary. In this regard, there is no limitation. Further, the respective units can be piled up, so that space where the device is located can be saved. Further, the direction of piling-up of the units is not limited. For example, the units may be piled up vertically, horizontally or obliquely.

The synthetic inductance L of one superconducting energy storage unit is represented by the equation:

$$L = L_1 + L_2 \tag{1}$$

where $L_1$ represents the self-inductance of the superconducting toroidal magnet, and $L_2$ represents the self-inductance of the superconducting solenoid magnet.

The synthetic inductance $L_n$, of n units is represented by the equation:

$$L_n = n(L_1 + L_2) + 2L_2 \sum_{i=k}^{n} k^i_{i+1} \tag{3}$$

where k is a coupling coefficient between adjacent solenoid magnets of unit i and unit i+1, and the coupling coefficient satisfies the relation $$k^n_{n+1} = k^{n-1}_n.$$

It is apparent from the equations that the relation $L_n > nL$ should hold. Accordingly, by piling-up of storage units, storage energy can be increased to be more than a value multiplied by a factor n.

In each of the aforementioned embodiments, by use of a high-temperature ($\geq$ liquid nitrogen level) superconducting material as a wire material for each of the magnets it is possible to provide a high-performance superconducting energy storage device which is very simple in terms of freezing equipment and in maintenance.

According to the superconducting energy storage device as described above, the superconducting solenoid magnet is arranged to be inside of the superconducting toroidal magnet and electrically connected to the superconducting toroidal magnet in series. Accordingly, when excited, the superconducting toroidal magnet generates contracting force in the direction of the large radius. On the other hand, the superconducting solenoid magnet generates expanding force in the direction of the radius. The contracting force of the superconducting toroidal magnet can be canceled out by the expanding force of the superconducting solenoid magnet, so that electromagnetic force generated by the superconducting magnets can be supported without the necessity of a firm bed rock. Consequently, the present invention has an effect in that limitation in conditions of location can be eliminated.

According to another aspect of the present invention, the superconducting solenoid magnet is arranged to enclose the superconducting toroidal magnet and electrically connected to the superconducting toroidal magnet in series. Accordingly, when excited, the superconducting toroidal magnet generates contracting force in the direction of the large radius and expanding force in the directions of the individual small radii. On the other hand, when excited, the superconducting solenoid magnet generates expanding force in the direction of the large radius and pinch force in the directions of the individual small radii. The contracting force of the superconducting toroidal magnet and the expanding force of the superconducting solenoid magnet acting in the direction of the large radius cancel out. At the same time, the expanding force of the superconducting toroidal magnet and the pinch force of the superconducting solenoid magnet acting in the directions of the individual small radii cancel out. Accordingly, electromagnetic force generated by the superconducting magnets can be supported without the necessity of firm bed rock. Consequently, the present invention has an effect in that limitations in conditions of location can be eliminated.

According to a further aspect of the present invention, the superconducting magnets comprise a plurality of units, each of the units being formed by connecting the superconducting toroidal magnet electrically in series to the superconducting solenoid magnet arranged to be inside of the superconducting toroidal magnet, the plurality of units being piled up along the axis of the cylindrical superconducting solenoid magnet. Accordingly, the plurality of energy storage units can be arranged effectively so that space can be saved. Consequently, the present invention has an effect in that saving of space and increasing of storage energy can be attained.

Further, when the superconducting solenoid magnet is inside of the superconducting toroidal magnet, the contacting surface between the two magnets is formed like a plane because the superconducting toroidal magnet is D-shaped in section or substantially D-shaped in section by arranging a support integrally on a circular-section superconducting toroidal magnet. Accordingly, the present invention has an effect in that the mechanical connection between the two magnets can be improved such that it is firmer.

We claim:

1. A superconducting energy storage device for storing electric energy in the form of magnetic energy by passing an electric current through superconducting magnets for the purpose of releasing the magnetic energy in the form of electric energy as occasion demands, said superconducting magnets comprising a superconducting toroidal magnet and a superconducting solenoid magnet inside of said superconducting toroidal magnet, said magnets being connected electrically in series to each other.

2. A superconducting energy storage device according to claim 1, in which a high-temperature superconducting wire material is used for at least one of said superconducting toroidal magnet and said superconducting solenoid magnet.

3. A superconducting energy storage device for storing electric energy in the form of magnetic energy by passing an electric current through superconducting magnets for the purpose of releasing the magnetic energy in the form of electric energy as occasion demands, said superconducting magnets comprising a superconducting toroidal magnet having a D-shaped section and a cylindrical superconducting solenoid magnet inside of said D-section superconducting toroidal magnet, said magnets being connected electrically in series to each other.

4. A superconducting energy storage device according to claim 3, in which an electric source is provided to simultaneously excite and control said D-section superconducting toroidal magnet and said cylindrical superconducting solenoid magnet connected electrically in series to each other.

5. A superconducting energy storage device according to claim 3, in which electric sources are provided to respectively and independently excite and control said D-section superconducting toroidal magnet and said cylindrical superconducting solenoid magnet connected electrically in series to each other.

6. A superconducting energy storage device according to claim 5, further comprising a plurality of detectors provided for at least one of said D-section superconducting toroidal magnet and said cylindrical superconducting solenoid magnet for detecting stress and electric current in said magnets, and a controller responsive to respective output signals from said plurality of detectors to control said electric sources.

7. A superconducting energy storage device according to claim 3, in which a high-temperature superconducting wire material is used for at least one of said superconducting toroidal magnet and said superconducting solenoid magnet.

8. A superconducting energy storage device for storing electric energy in the form of magnetic energy by passing an electric current through superconducting magnets for the purpose of releasing the magnetic energy in the form of electric energy as occasion demands, said superconducting magnets comprising: a superconducting toroidal magnet including a superconducting toroidal magnet having a circularly-shaped section and a support integrally provided on the inside of said circular-section superconducting toroidal magnet so as to form a substantially D-shaped section; and a cylindrical superconducting solenoid magnet inside of said superconducting toroidal magnet, said magnets being connected electrically in series to each other.

9. A superconducting energy storage device according to claim 8, in which an electric source is provided to simultaneously excite and control said circular-section superconducting toroidal magnet and said cylindrical superconducting solenoid magnet connected electrically in series to each other.

10. A superconducting energy storage device according to claim 8, in which electric sources are provided to respectively and independently excite and control said circular-section superconducting toroidal magnet and said cylindrical superconducting solenoid magnet connected electrically in series to each other.

11. A superconducting energy storage device according to claim 8, further comprising a plurality of detectors provided for at least one of said circular-section superconducting toroidal magnet and said cylindrical superconducting solenoid magnet for detecting stress and electric current in said magnets, and a controller responsive to respective output signals from said plurality of detectors to control said electric sources.

12. A superconducting energy storage device according to claim 8, in which a high-temperature superconducting wire material is used for at least one of said circular-section superconducting toroidal magnet and said cylindrical superconducting solenoid magnet.

13. A superconducting energy storage device for storing electric energy in the form of magnetic energy by passing an electric current through superconducting magnets for the purpose of releasing the magnetic energy in the form of electric energy as occasion demands, said superconducting magnets comprising a superconducting toroidal magnet circularly-shaped in section and comprising a plurality of ring-shaped unit coils arranged in the shape of a toroid, and a cylindrical superconducting solenoid magnet enclosing said superconducting toroidal magnet therein, said magnets being connected electrically in series to each other.

14. A superconducting energy storage device for storing electric energy in the form of magnetic energy by passing an electric current through superconducting magnets for the purpose of releasing the magnetic energy in the form of electric energy as occasion demands, said superconducting magnets comprising a plurality of units, each of said units being formed by connecting a superconducting toroidal magnet electrically in series to a superconducting solenoid magnet inside of said superconducting toroidal magnet, said plurality of units being stacked along the axis of said superconducting solenoid magnet.

15. A superconducting energy storage device according to claim 14, in which a high-temperature superconducting wire material is used for at least one of said superconducting toroidal magnet and said superconducting solenoid magnet.

16. A superconducting energy storage device for storing electric energy in the form of magnetic energy by passing an electric current through superconducting magnets for the purpose of releasing the magnetic energy in the form of electric energy as occasion demands, said superconducting magnets being composed of a plurality of units, each of said units comprising a superconducting toroidal magnet having a D-shaped section and a cylindrical superconducting solenoid magnet inside of said superconducting toroidal magnet, said magnets being connected electrically in series to each other, said plurality of units being piled up in the axial direction of said cylindrical superconducting solenoid magnet.

17. A superconducting energy storage device according to claim 16, in which an electric source is provided to simultaneously excite and control said D-section superconducting toroidal magnet and said cylindrical superconducting solenoid magnet connected electrically in series to each other.

18. A superconducting energy storage device according to claim 16, in which a high-temperature superconducting wire material is used for at least one of said D-shaped superconducting toroidal magnet and said cylindrical superconducting solenoid magnet.

19. A superconducting energy storage device for storing electric energy in the form of magnetic energy by passing an electric current through superconducting magnets for the purpose of releasing the magnetic energy in the form of electric energy as occasion demands, said superconducting magnets being composed of a plurality of units, each of said units comprising: a superconducting toroidal magnet including a superconducting toroidal magnet having a circularly-shaped section and a support integrally provided on the inside of said circular-section superconducting toroidal magnet so as to form a substantially D-shaped section; a cylindrical superconducting solenoid magnet inside of said superconducting toroidal magnet, said magnets being connected electrically in series to each other; and said plurality of units being piled up in the axial direction of said cylindrical superconducting solenoid magnet.

20. A superconducting energy storage device according to claim 19, wherein said cylindrical superconducting solenoid magnet is inside of said support.

21. A superconducting energy storage device according to claim 8, wherein said cylindrical superconducting solenoid magnet is inside of said support.

22. A superconducting energy storage device according to claim 1, wherein a contacting surface between said superconducting toroidal magnet and said superconducting solenoid magnet is a planar surface.

23. A superconducting energy storage device according to claim 3, wherein a contacting surface between said superconducting toroidal magnet and said superconducting solenoid magnet is a planar surface.

24. A superconducting energy storage device according to claim 8, wherein a contacting surface between said superconducting toroidal magnet and said superconducting solenoid magnet is a planar surface.

25. A superconducting energy storage device according to claim 13, wherein a contacting surface between said superconducting toroidal magnet and said superconducting solenoid magnet is a planar surface.

26. A superconducting energy storage device according to claim 14, wherein a contacting surface between said superconducting toroidal magnet and said superconducting solenoid magnet is a planar surface.

27. A superconducting energy storage device according to claim 16, wherein a contacting surface between said superconducting toroidal magnet and said superconducting solenoid magnet is a planar surface.

28. A superconducting energy storage device according to claim 19, wherein a contacting surface between said superconducting toroidal magnet and said superconducting solenoid magnet is a planar surface.

* * * * *